2,999,829
AQUEOUS SHELL MOLDING COMPOSITION COMPRISING MALEIC ACID, FURFURYL ALCOHOL, AND UREA

Leo H. Treat, Inkster, Mich., and Robert C. Shaffer, West Los Angeles, Calif.
No Drawing. Filed June 25, 1954, Ser. No. 439,483
4 Claims. (Cl. 260—29.6)

This invention relates broadly to the production of resinous materials from reactive mixtures of liquid furane derivatives and maleic acid or the anhydride of maleic acid or both and employing the controllable initiation of the rapid resinification reaction in a process for producing resin bonded aggregates of particulate matter such as foundry shell molds for metal casting. Another type of aggregate, whose production is contemplated, comprises abrasive grain such as silicon carbide or fused alumina bonded with our novel thermosetting resin.

An object of this invention is to provide a novel thermosetting resin, rigid, infusible and insoluble, by reacting furfuryl alcohol with maleic acid or anhydride or substituted maleic acid or anhydride, such as chloromaleic anhydride, said resin being produced from a mixture of reactants that may be maintained in the unresinified state for processing convenience and yet caused to react very rapidly when so desired.

A further object of this invention is to provide a novel mixture of reactants and inhibitor which will possess extended shelf life.

Another object is to provide a novel thermosetting material suitable for use in producing resin bonded sand shells or molds that can be applied as a liquid coating on sand and that will not be dusty nor undergo segregation in handling incident to forming a shell.

Yet another object of this invention is to provide a novel resin suitable for use in a process whereby an uncured resin-sand shell is formed on a cold pattern, the pattern withdrawn, and the shell heat-cured at such a temperature level and with such rapidity that loss of reactants by volatilization is minimized.

Still another object is to provide certain additive materials, incorporated into the resin to improve quality of surface smoothness and reproduction of pattern details in resin bonded sand shells.

It has been known in the art that various liquid furane derivatives could be caused to undergo resinification reactions by catalysis with small additions (1 to 2 percent by weight) of mineral acids. The resinification reactions thus induced were rapid, highly exothermic, and practically uncontrollable once initiated, yielding black, porous, infusible resinous solids of little practical value. Considerable effort has been expended in seeking to modify the rate of the polymerization reactions by use of milder, less active catalysts than mineral acids such as organic materials (U.S. Pat. 2,432,890) and inorganic acid salts of organic materials (U.S. Pat. 2,345,966). The objective in using mild catalysts has often been the production of partially polymerized, viscous liquids or low melting solids that are susceptible of further rather slow curing to infusible solids by elevated temperature treatment.

We have discovered that a liquid mixture comprising furfuryl alcohol (2 parts by weight) and maleic anhydride (1 part) maintained at room temperature will undergo only slow conversion to viscous or solid resin, yet may be very rapidly converted to a rigid solid by heating to temperatures about that of boiling water. We have found the solid resin so produced is strong and adheres well to many solid surfaces. We have perceived that the above properties admirably fit the requirements of a process for rapidly producing resin bonded sand shells or molds. Thus we may admix the mutually soluble components of our resin forming mixture, as a sirupy liquid, or as individual components with 10 or more weights of sand to form a moderately free-flowing, dust free mixture, a mass of which may, by known procedures, be caused to conform to a pattern and upon concurrent or subsequent application of mild heat be caused to bond into a solid mass with reproduction of pattern contour.

We have also discovered that the proportion of the maleic acid or anhydride to furfuryl alcohol largely controls strength of resin bonded sand shells or molds. A range of approximately 20 to 50 parts of maleic acid or anhydride per 100 parts of furfuryl alcohol is suitable to effect strong sand-resin bonding. A preferred proportion is about 33 parts maleic anhydride to 100 parts of furfuryl alcohol.

The addition of minor amounts of urea and/or of water to the resin forming mixture is advantageous when it is desired to form a sand shell bonded together by the resin. Such additions in the amount of about 2 to 10 weight percent urea and/or up to 20 weight percent water (percentage based upon the resin forming mixture) improve shell surface and reproduction of pattern detail.

The compositions of reactants employed to produce the resin product are only very slowly reactive at room temperature; however, as will be appreciated by those skilled in the art, it is sometimes desirable to store the mixture of reactants for periods of time. We have found that inhibitors may advantageously be added to increase storage life at room temperature. Such materials as ammonium salts may be added to the above indicated compositions of reactants in amounts of 0.2–5 weight percent. A preferred inhibitor, from the standpoint of effectiveness and cheapness, is ammonium chloride added in the amount of 0.5 percent. Such use of ammonium chloride will increase satisfactory storage life at room temperature from approximately one day to two weeks. Satisfactory storage life is considered to end when viscosity of the mixture of reactants rises to such a level that the mixture cannot be readily handled.

These furfuryl alcohol-maleic anhydride compositions properly modified may be admixed with sand in amounts as low as 2 percent to form a moderately free-flowing mixture that will form a strong satisfactory resin-bonded sand shell for casting metal by known procedures of conforming the sand mix to a pattern and subsequent application of mild heat. The resin-forming materials may be added to the sand as a homogeneous solution or as individual components during the mixing process. The strength of a cured aggregate will depend somewhat upon the clay content, particle size and particle size distribution of the sand or other granular material contained in the aggregate as well as upon the proportion of resin in the aggregate.

Sand-resin shells may be prepared from our novel composition by known foundry methods including core blowing and dump box techniques. The sand mix may be blown into cold or hot patterns. With the use of hot patterns, the pattern temperature may be 300 to 600° F. and usually no further cure will be necessary. Green shells may be cured by oven, infrared, or dielectric heat.

The compositions of reactants employed to produce the resin bond are only very slowly reactive at room temperature and are very rapidly converted to a rigid solid at temperatures above 185° F. The modified furfuryl-maleic anhydride composition without sand will form a solid resin in 55 seconds at 230° F. or 7 seconds at 310° F. The rate at which a green sand shell will cure depends on the temperature of the conforming pattern or of the surrounding atmosphere, application of heat to one or both sides, the rate of heat transfer through the sand mix, and the thickness of the shell. By using the dumpbox technique, a 450° F. pattern cures a 3/16 inch shell in 30 seconds. Heating a green shell from both sides, such as in oven cure or blowing with hot patterns, causes a faster cure for any given thickness than heating from only one side.

In order that those skilled in the art may better understand how the present invention may be practiced the following examples are given. All parts are by weight.

*Example I*

A solution of furfuryl alcohol and maleic anhydride was prepared by stirring a mixture of 66 parts commercial grade furfuryl alcohol and 34 parts of commercial grade maleic anhydride in a beaker until the anhydride was dissolved. A sand mixture was prepared by mixing 6 percent of the above solution with dry bank sand. A tensile briquet was made from the sand mixture in a cement briquet mold preheated to 300° F., using a metal weight to simulate dump box sand pressure. The briquet mold containing the sand mixture was heated 10 minutes in a 300° F. oven. The tensile strength of the cured briquet was 215 p.s.i.

*Example II*

Similarly a sand mix was prepared with 6 percent of a solution containing 67 parts furfuryl alcohol, 33 parts maleic anhydride, and 5 parts urea. A tensile briquet prepared from this 6 percent sand mixture had a tensile strength of 348 p.s.i. Suitable sand-resin shell molds for metal castings were prepared from the 6 percent sand-resin mix.

*Example III*

A sand mix was prepared with 1½ percent water and 4½ percent of a solution containing 40 parts furfuryl alcohol, 20 parts maleic anhydride, and 3 parts urea. Shell molds were made from this sand mixture by the dump box technique with a pattern at 450° F. The shells were completely cured on removal from the dump box. The shells had excellent surface and definition, better than that from mix without water.

*Example IV*

A solution of the following materials was made by mixing in a beaker contained in a water bath.

| | Parts |
|---|---|
| Furfuryl alcohol | 75 |
| Water | 10 |
| Urea | 5 |
| Ammonium chloride | 0.5 |
| Maleic acid | 25 |

During the mixing, the temperature decreased to 52° F. due to the negative heat of solution. The solution was heated to 75° F. by the hot water bath to facilitate the dissolving of the maleic acid. In order to test the shelf life of the above mixture, satisfactory sand-resin shells for metal casting were made by the dump box technique with sand containing 5 percent of the above mixture 6 and 27 hours after mixing the solution. Satisfactory sand-resin shells cannot be prepared with a furfuryl alcohol-maleic acid sand mix not containing ammonium chloride by the dump box technique 4 or 5 hours after mixing.

Sand mixture contact times of 30 and 60 seconds on the 450° F. pattern in the dump box formed 3/16 and 1/4 inch thick shells, respectively.

*Example V*

A mix was prepared with 4 percent of a solution of the following materials and with dry bank sand AFS No. 90.

| | Parts |
|---|---|
| Furfuryl alcohol | 75 |
| Maleic anhydride | 25 |
| Urea | 5 |
| Ammonium chloride | 0.5 |

Tensile briquets and 3/16-inch shell molds for casting metal were prepared by blowing the 4 percent sand mix with 100 p.s.i. air in a Redford core blower into cold patterns. The green briquets were removed from the pattern and cured in a 300° F. oven. The average strength of the briquets was 355 p.s.i. After the sand shell molds had been blown, the primary surface pattern was removed and the green mold was cured on the backing plate in a 300° F. oven. Some shells were cured by infrared heat of flames directed at the surface of the sand shell. The 4 percent sand mix could be used for shell blowing over a period of two weeks, after which the mix became too viscous for blowing.

*Example VI*

A solution of the following materials was prepared to test the effect of chloromaleic anhydride.

| | Parts |
|---|---|
| Furfuryl alcohol | 75 |
| Urea | 5 |
| Water | 10 |
| Chloromaleic anhydride | 29 |

Some cooling was applied during solution to maintain the temperature below 90° F. A sand mix containing 5 percent of this solution was used to prepare sand-resin molds by the hot pattern-dump box method. A period of 30 seconds' residence of the sand on the hot metal pattern at 450 and 550° F. gave good shells of 1/8 and 3/16 inch thick, respectively.

*Example VII*

A furfuryl alcohol sand mix was prepared from the following materials.

| | Parts |
|---|---|
| Maleic anhydride | 14.2 |
| Urea | 2.4 |
| Ammonium chloride | .25 |
| Sand | 1940 |
| Furfuryl alcohol | 43.1 |

The dry materials were first mixed in a Hobart food mixer and then the furfuryl alcohol was mixed. The average strength of cured tensile briquets blown with the above sand mix in a Redford core blower was 252 p.s.i.

*Example VIII*

In order to test the effect of the maleic anhydride content, tensile briquet were made from sand mixes containing 5 percent furfuryl alcohol solutions of maleic anhydride containing 3/4 part of urea per 10 parts of alcohol plus anhydride. The sand mix was packed by a steel weight in the briquet form to simulate dump box pressure. The briquet form was preheated to 285° F. and the form with green briquet was heated for 10 minutes in a 285° F. oven.

The effect of the maleic anhydride content is indicated by the tensile strengths of the cured briquets shown below.

| Maleic Anhydride, parts/100 parts alcohol | Tensile Strength, p.s.i. |
|---|---|
| 25 | 180 |
| 33 | 260 |
| 43 | 270 |

*Example IX*

Similar to the work in Example VIII, the effects of urea content are indicated below for sand mixes containing 6 percent of furfuryl alcohol-maleic anhydride solutions in ratio of 2 to 1, respectively.

| Urea, parts/ 100 parts alcohol | Tensile strength, p.s.i. | Surface |
|---|---|---|
| 11 | 310 | Excellent |
| 22 | 124 | Fair |
| 45 | 62 | Poor |

We claim as our invention:

1. A metastable, substantially monomeric solution capable of rapid polymerization to an infusible and insoluble solid upon the application of heat, said solution comprising about 100 parts of furfuryl alcohol, 20 to 50 parts of a substance selected from the group consisting of maleic acid and maleic anhydride and 2 to 10% of urea based upon the combined weight of the furfuryl alcohol and maleic constituent, said solution being stabilized by the presence of 0.2 to 5% by weight of ammonium chloride.

2. A metastable, substantially monomeric solution capable of rapid polymerization to an infusible and insoluble solid upon the application of heat, said solution comprising about 100 parts of furfuryl alcohol, 20 to 50 parts of a substance selected from the group consisting of maleic acid and maleic anhydride, 2 to 10% of urea and a significant amount up to 20% of water, both percentages being by weight of the combined furfuryl and maleic constituents, said solution being stabilized by the presence of 0.2 to 5% by weight of ammonium chloride.

3. A shell molding material comprising foundry sand containing 2 to 10 percent by weight of a solution, said solution comprising furfuryl alcohol, 75 parts, maleic anhydride, 25 parts, urea, 5 parts, and ammonium chloride, ½ part.

4. A metastable, substantially monomeric solution capable of rapid polymerization to an infusible and insoluble solid upon the application of heat, said solution comprising about 100 parts of furfuryl alcohol, 20 to 50 parts of a substance selected from the group consisting of maleic acid and maleic anhydride and 2 to 10% of urea based upon the combined weight of the furfuryl alcohol and maleic constituent.

References Cited in the file of this patent

UNITED STATES PATENTS 2,432,890   Hersh _____ Dec. 16, 1947
2,534,743   Vincent _____ Dec. 19, 1950

OTHER REFERENCES

J. Chem. Soc. Japan (J.C.S.J.), Ind. Chem. Sec., volume 51, pages 43–44 (1948) (abstracted in 44 Chemical Abstracts 9190 (1950)).